United States Patent
Gao (10) Patent No.: US 12,450,231 B1
(45) Date of Patent: Oct. 21, 2025

(54) GLOBAL DIRECTED ACYCLIC GRAPHS IN DISTRIBUTED COMPUTING SYSTEMS

(71) Applicant: Zoom Communications, Inc., San Jose, CA (US)

(72) Inventor: Lun Gao, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/662,394

(22) Filed: May 13, 2024

(51) Int. Cl.
  *G06F 16/00* (2019.01)
  *G06F 16/2453* (2019.01)
  *G06F 16/901* (2019.01)

(52) U.S. Cl.
  CPC .... *G06F 16/24542* (2019.01); *G06F 16/9024* (2019.01)

(58) Field of Classification Search
  CPC . G06F 16/24542; G06F 16/9024; G06F 16/28
  USPC .................................................. 707/718, 798
  See application file for complete search history.

(56) References Cited

U.S. PATENT DOCUMENTS

| | | | |
|---|---|---|---|
| 11,249,876 B2 | 2/2022 | Singhal et al. | |
| 11,334,567 B2* | 5/2022 | Ziauddin | G06F 16/9024 |
| 11,394,769 B2 | 7/2022 | Park et al. | |
| 2023/0057335 A1 | 2/2023 | Prismon et al. | |
| 2023/0252077 A1* | 8/2023 | Kapp | G06F 16/28 707/798 |

FOREIGN PATENT DOCUMENTS

| | | |
|---|---|---|
| CN | 107402952 A | 11/2017 |
| CN | 109033109 A | 12/2018 |
| CN | 113434533 A | 9/2021 |
| CN | 109690517 B | 4/2023 |
| CN | 111240662 B | 1/2024 |

* cited by examiner

*Primary Examiner* — Chelcie L Daye
(74) *Attorney, Agent, or Firm* — Young Basile Hanlon & MacFarlane, P.C.

(57) ABSTRACT

Creating a global directed acyclic graph (DAG) of an execution plan according to a logical plan derived from one or more Structured Query Language (SQL) queries. The logical plan comprises a set of SqlNodes, where each non-root SqlNode includes parent SqlNode information. The DAG comprises vertices connected by edges, wherein each vertex corresponds to a respective relational expression of a set of relational expressions and is labeled according to an operator of an execution engine, such as Spark, that has been mapped to the respective relational expression. The DAG may be displayed via a graphical user interface. In some implementations, one or more vertices includes information indicating a level of execution parallelism and/or cache enablement.

20 Claims, 7 Drawing Sheets

```
SQL:
insert into sink.`table`
select x, sum(y)
from
  (
    select x, y from
    (
      select * from source.`table`
      where aa = 'bb'
    ) t1
  ) t2
where cc = 'dd' group by x
```

Calcite AST:
*Current*: SqlInsert, SqlNodeList(project),SqlBasicCall(where),SqlNodeList(groupBy),
*Parent*: SqlNodeList(project),
*Parent*: SqlNodeList(project), SqlBasicCall(where), SqlSelect(source)

```
DOT:
digraph G {
  node [fontname="Helvetica"];
  rankdir=LR;
  SOURCE -> FILTER [label="forward"];
  FILTER -> PROJECT [label="forward"];
  PROJECT -> PROJECT [label="forward"];
  PROJECT -> FILTER [label="forward"];
  FILTER -> PROJECT [label="forward"];
  PROJECT -> AGGREGATOR [label="forward"];
  AGGREGATOR -> SINK [label="key"];
}
```

Spark Operators:
*Current*: SinkOperator, ProjectOperator, FilterOperator, AggOperator,
*Parent*: ProjectOperator,
*Parent*: ProjectOperator, FilterOperator, SourceOperator

GLOBAL DIRECTED ACYCLIC GRAPHS IN DISTRIBUTED COMPUTING SYSTEMS

FIELD

This disclosure generally relates to preprocessing of Structured Query Language (SQL) code, and more specifically, to creating a global directed acyclic graph (DAG) of an execution plan for optimization and execution via a distributed execution engine.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

SQL is a programming language used for managing and manipulating relational databases. SQL enables users to interact with databases by defining, querying, and manipulating data stored in tables. SQL is widely used in the field of database management and is supported by most relational database management systems (RDBMS). Key features of SQL include the following. (1) Data Querying: SQL allows users to retrieve specific data from a database using the SELECT statement. Queries can involve filtering, sorting, grouping, and aggregating data. (2) Data Manipulation: SQL provides statements like INSERT, UPDATE, and DELETE for modifying data stored in tables. (3) Data Definition: SQL supports statements like CREATE, ALTER, and DROP for defining and modifying the structure of a database schema, including tables, indexes, views, and constraints. (4) Data Control: SQL includes commands for managing access to the database, such as GRANT and REVOKE, which control privileges like SELECT, INSERT, UPDATE, DELETE, and others.

Before SQL queries are executed by an execution engine, the corresponding SQL code must be compiled. The terms "compiling" or "compiler" in the context of SQL can encompass all or most of the preprocessing steps that may be necessary prior to execution of SQL code, including the following. (1) Parsing: Parsing involves analyzing the syntactic structure of SQL code to create an abstract representation, typically a parse tree or AST. (2) Validation: Validation ensures that the parsed SQL code conforms to the semantic rules and constraints of the underlying data model, checking elements such as table and column existence and data types. (3) Compilation: Compilation translates the optimized SQL code into a logical plan, which outlines the sequence of operations needed to fulfill the specified operations on the database.

After compilation, an execution engine transforms a logical plan into an execution plan (sometimes called a physical execution plan). The execution plan outlines the detailed steps and operations that the execution engine will perform to execute the computation(s) described by the logical plan. It considers factors such as data partitioning, task scheduling, and resource allocation to efficiently execute the computation(s) across a cluster of computational devices. The execution engine may perform the following key functions. (1) Task Scheduling: The execution engine breaks down the execution plan into smaller tasks and schedules these tasks to run on the available resources within a computer cluster. The execution engine ensures that these tasks are scheduled efficiently across the cluster. (2) Distributed Processing: The execution engine coordinates the distributed processing of data across the nodes, or computers, of the computer cluster. It manages data partitioning, data shuffling, and data movement between nodes to ensure that the computation is performed in parallel and efficiently utilizes the available resources. (3) Fault Tolerance: The execution engine incorporates fault tolerance mechanisms to handle failures gracefully. It monitors the execution of tasks and tracks the lineage of Resilient Distributed Datasets (RDDs) or DataFrames to enable recomputation of lost or corrupted data partitions in case of node failures. (4) Data Caching and Persistence: The execution engine supports caching and persistence of intermediate data to optimize performance. It enables users to specify which data should be cached in memory or persisted to disk, reducing the need for recomputation and improving overall query performance. (4) Integration with Storage Systems: The execution engine interacts with storage systems like Hadoop Distributed File System (HDFS), Amazon Simple Storage Service (S3), or other cloud storage solutions to read input data and write output data generated during query execution. Overall, the execution engine plays a central role in orchestrating the distributed execution of SQL queries and other computations, ensuring efficient resource utilization, fault tolerance, and high-performance data processing on large-scale datasets.

Two common distributed computing systems, or platforms, for compiling and executing SQL code are Apache Spark and Apache Flink. Apache Spark is an open-source distributed computing system that provides an interface for programming entire clusters with implicit data parallelism and fault tolerance. Spark's core abstraction is the RDD, a distributed collection of objects. Spark offers several higher-level libraries built on top of its core, including Spark SQL, which provides support for executing SQL queries (i.e., SQL code) and working with structured data using DataFrame application programming interface (API) or SQL queries. With Spark SQL, users can write SQL queries to process large volumes of data efficiently in parallel across a cluster. Apache Flink is another open-source distributed computing system, which operates according to a data-stream processing framework that provides data distribution, communication, and fault tolerance for distributed computations. Flink's core abstraction is the DataStream API for processing unbounded streams of data and the DataSet API for batch processing. Flink also offers support for SQL queries through Flink SQL, which allows users to write SQL queries to process both streaming and batch data. Flink's SQL support includes a rich set of built-in functions, windowing capabilities, and support for complex event processing (CEP). Although the example implementations described herein focus on Apache Spark, utilization of other distributed computing systems, such as Apache Flink, is within the scope of this disclosure.

In Spark, for example, a logical plan and/or an execution plan, that results from compiled SQL code, can be represented by DAG at execution time. A DAG is essentially a graph of the computational dependencies between different RDDs or DataFrames resulting from transformations in the SQL code. Each vertex in the DAG represents an operation or transformation, and the edges represent the flow of data between these operations. Both vertices and edges can represent operations in Spark, which are referred to herein as "operational vertices" and "operational edges," respectively. Traditionally, the DAG produced by Spark is local rather than global. A local DAG represents only a portion of the logical plan and/or execution plan, whereas a global DAG represents an entire logical plan and/or execution plan that results from the compiled SQL code. Spark's DAG is local because Spark constructs the DAG dynamically (e.g., incrementally) just prior to execution of a next stage of the logical plan based on the sequence of transformations and actions invoked by the SQL code. Each RDD or DataFrame transformation adds to the existing DAG, and actions trigger the execution of the DAG up to that point.

While platforms like Spark and Flink can generate DAGs to represent the logical plans and/or execution plans of SQL queries, these DAGs often lack comprehensive content information. For instance, a Spark DAG may not adequately convey parallelism or data-exchange strategies, which are crucial details for understanding and optimizing query performance. Consequently, after developers use SQL to develop a logical plan (e.g., so-called job logic), they may find themselves lacking clarity about how the jobs actually run on an execution engine, such as how a complex execution plan and shuffle rules of the SQL will be performed. Exposing additional information to developers in a visual or graphical manner, such as parallelism and data-exchange strategies, can greatly aid their SQL logic development and performance optimization efforts.

Additionally, platforms like Spark or Flink generally include integrated, platform-specific SQL compilers (which may perform parsing, validating, optimizing, and compiling) and platform-specific SQL execution engines (which performs SQL queries on the database). These integrated compilers and execution engines pose challenges for data-development engineers (e.g., developers) who may work across different platforms and/or execution engines due to an inability to mix-and-match different compilers and execution engines.

Implementations of this disclosure address problems such as these by providing a system and method (e.g., a tool) to enable visual or graphical representations of the execution plans and shuffle rules of SQL queries to be performed by an SQL execution engine. The tool creates a global DAG for the entire job based on a custom data structure representing each vertex, where each vertex corresponds to an operator of an execution engine, such as Spark, and the data structure carries information about the operator, such as parallelism, whether to enable data caching, and information about parent vertices. In one implementation, a method for creating a global DAG of an execution plan comprises compiling an SQL query into a set of relational expressions, such as Spark RelNodes, wherein each relational expressions that is other than a root relational expression includes information identifying one or more parent relational expressions. Each relational expression is mapped to a respective operator of an execution engine, such as a Spark operator, and an execution plan of the SQL query is created according to the set of relational expressions and their mappings to respective operators. The execution plan is used to create a global DAG, wherein the global DAG comprises vertices connected by edges, and wherein each vertex corresponds to a respective relational expression of the set of relational expressions and is labeled according to the operator mapped to the respective relational expression. The global DAG is then displayed via a graphical user interface. Compared to local or partial DAGs that can be created using Spark, the global DAGs that can be generated by this tool can provide developers with a more comprehensive understanding of SQL query execution processes, including parallelism and data-exchange strategies, and can therefore facilitate more effective optimization of the execution plan. The tool further enables simulation of the entire job by traversing the global DAG from the root vertex to all leaf vertices.

To describe some implementations in greater detail, reference is first made to examples of hardware and software structures that can be used to create global DAGs in Spark.

Figure 1:
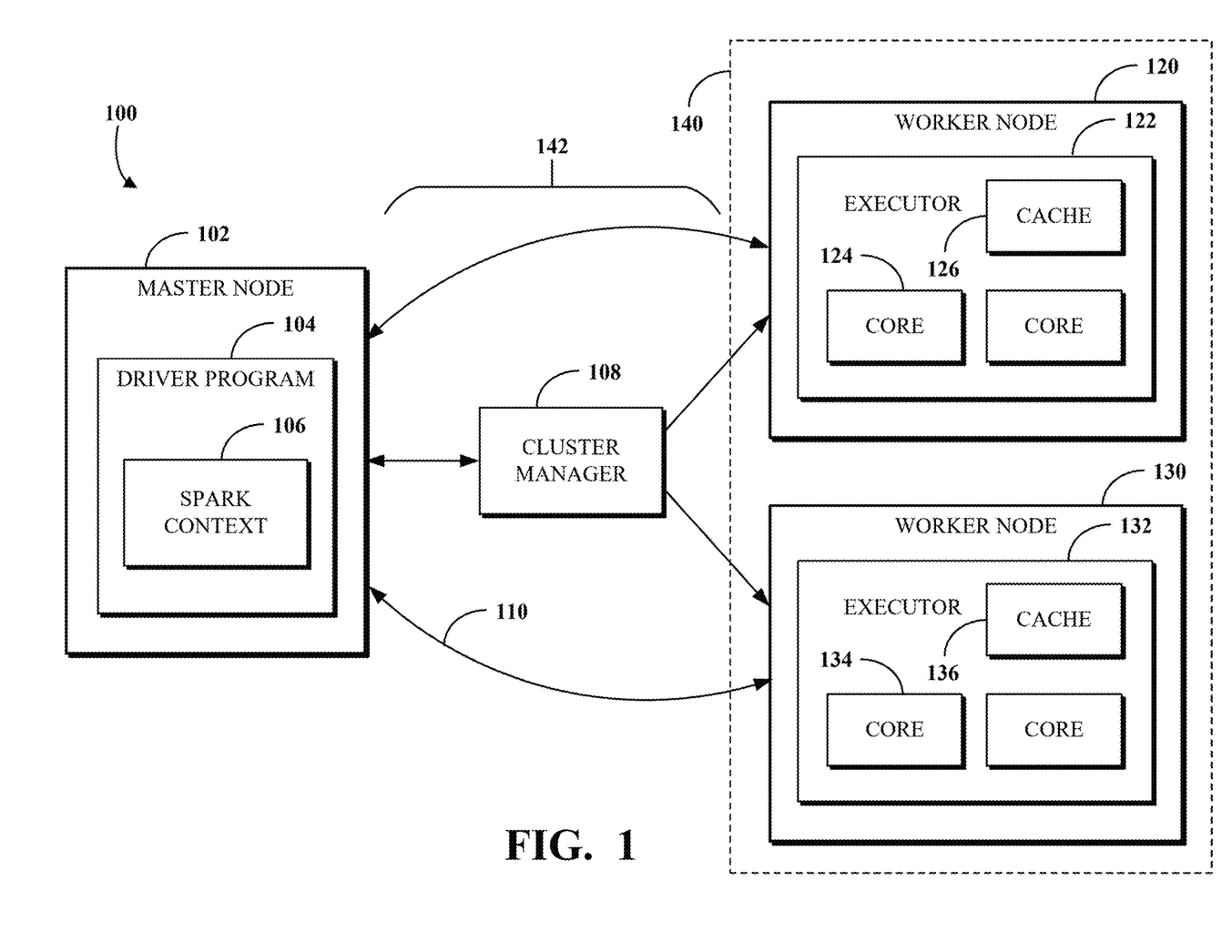
FIG. 1 is a block diagram of an example of a Spark execution system for executing SQL queries.

FIG. 1 is a block diagram of an example of a Spark execution system 100 for executing SQL queries. The Spark execution system 100 comprises a master node 102, a cluster 140, and a cluster manager 108. The cluster 140 comprises one or more cluster nodes, which in this example, are illustrated as a worker node 120 and a worker node 130. The master node 102 and the cluster manager 108 are communicatively coupled to each other and to the worker node 120 and the worker node 130, via one or more connections 110 of a network 142. The network 142 can be or include, for example, the Internet, a local area network (LAN), a wide area network (WAN), a virtual private network (VPN), or another public or private means of electronic computer communication capable of transferring data between computational devices. In some implementations, a computational device can connect to the network 142 via a communal connection point, link, or path, or using a distinct connection point, link, or path. For example, a connection point, link, or path can be wired (e.g., electrical or optical), wireless (e.g., electromagnetic, or optical), use other communications technologies, or a combination thereof.

The master node 102 serves as the central orchestrator of the Spark execution system 100, comprising a driver program 104 that includes Spark context 106. The driver program initiates and coordinates the execution of Spark applications, including the processing of SQL queries. The driver program 104 interfaces with the Spark context 106 to establish communication with the worker nodes 120 and 130, to initialize the execution environment, and to oversee task distribution and resource allocation. The cluster manager 108 is responsible for managing and coordinating the worker nodes 120 and 130 within the cluster 140.

Each worker node 120 and 130 comprises an executor 122 and 132, respectfully, which is responsible for executing tasks delegated by the master node 102. In some implementations, each executor 122 and 132 is a processor, such as a microprocessor. The executors 122 and 132 implement respective caches 126 and 136, for efficient data storage and retrieval during computation. Furthermore, each executor 122 and 132 implement one or more respective cores 124 and 134, which are responsible for carrying out specific computations as part of an SQL query execution process.

Figure 2:
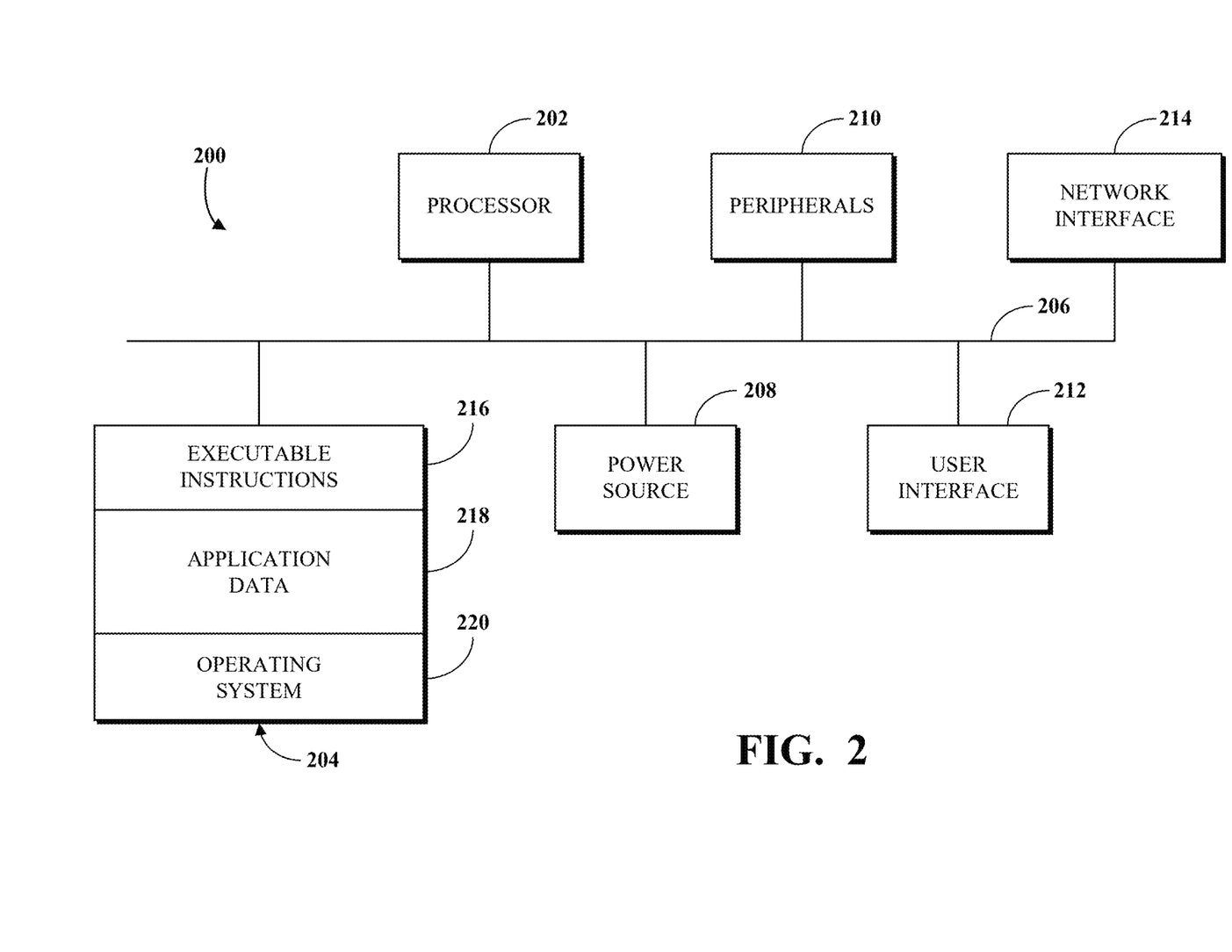
FIG. 2 is a block diagram of an example internal configuration of a computing device of an electronic computing and communications system.

FIG. 2 is a block diagram of an example internal configuration of a computing device 200 of a Spark execution system. In one configuration, the computing device 200 may implement one or more of the master node 102, the cluster manager 108, the worker node 120, or the worker node 130 of FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores, such as the cores 124 or 134 of FIG. 1. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be RAM (e.g., a DRAM module, such as DDR SDRAM). In another example, the non-volatile memory of the memory 204 can be a disk drive, a solid-state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 142 shown in FIG. 1). The network interface 214 can be a wired network interface or a wireless network interface. The computing device 200 can communicate with other devices via a network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
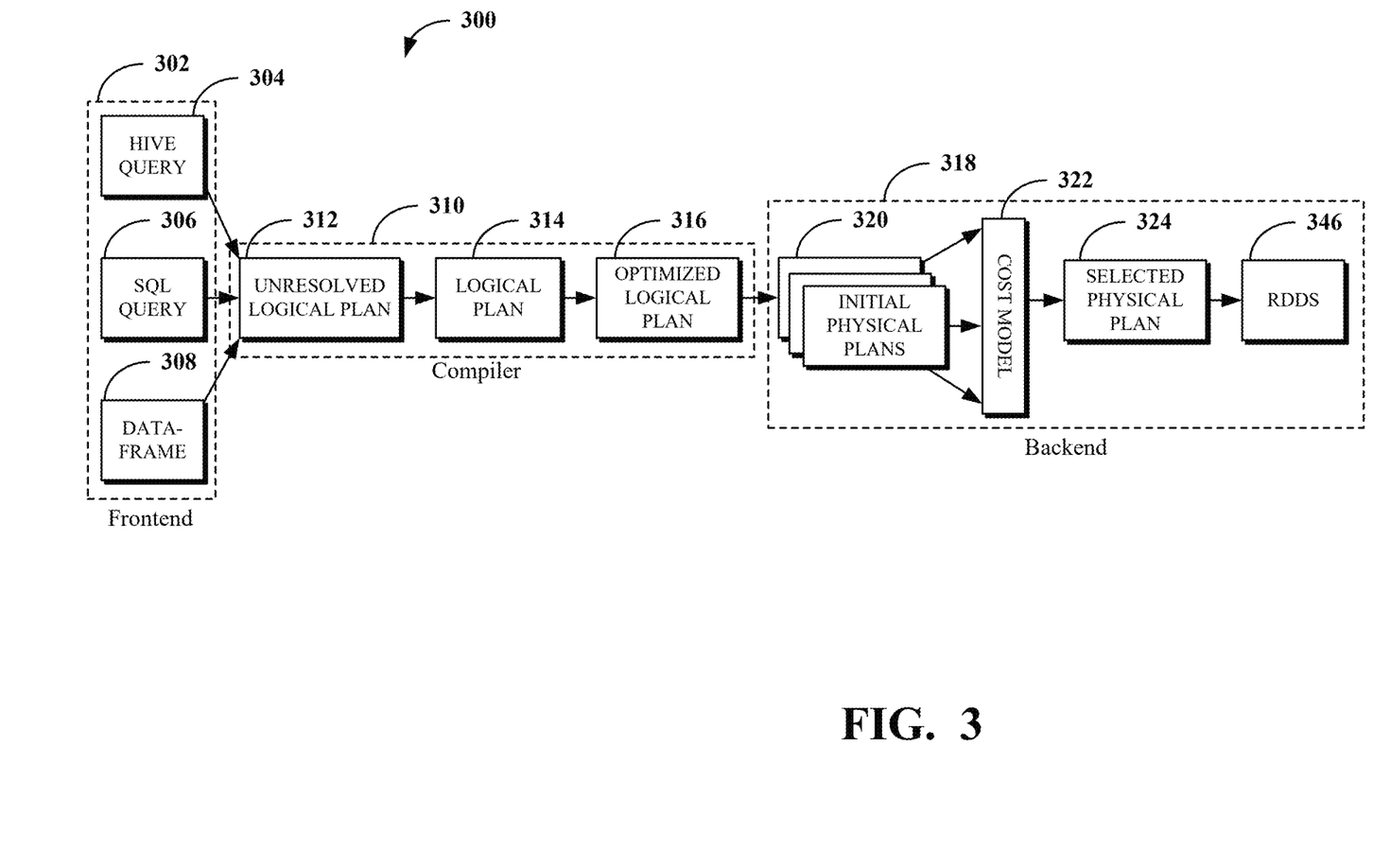
FIG. 3 is an example of a Spark optimization framework for translating one or more SQL queries of SQL code into executable operations on a database.

FIG. 3 is an example of a Spark optimization framework 300 for translating one or more SQL queries 306 of SQL code into executable operations on a database. The framework 300 can be partitioned into a frontend 302, a compiler 310, and a backend 318. The frontend 302 serves as the entry point for users to provide the SQL query 306, as well as other instruction formats such as a Hive query 304 and a DataFrame 308. The frontend 302 is responsible for accepting the various input formats and passing them to the compiler 310 for further processing.

The compiler 310 is the primary component responsible for translating SQL query 306 (and/or other inputs) into an optimized logical plan 316. The compiler 310 processes the SQL query 306 in several stages. The first stage yields an unresolved logical plan 312, which represents the initial representation of the SQL query 306 without any optimization applied. The second stage yields a logical plan 314, which is a refinement of the unresolved logical plan 312 based on resolving dependencies and applying standard optimization techniques. The third stage yields an optimized logical plan 316, which is a further refinement of the logical plan 314 based on advanced optimization strategies to further enhance query performance and efficiency. In a compiler such as Calcite, the unresolved logical plan 312, the logical plan 314, and/or the optimized logical plan 316 may each be represented by an AST comprising a set of SqlNodes.

Figure 4:
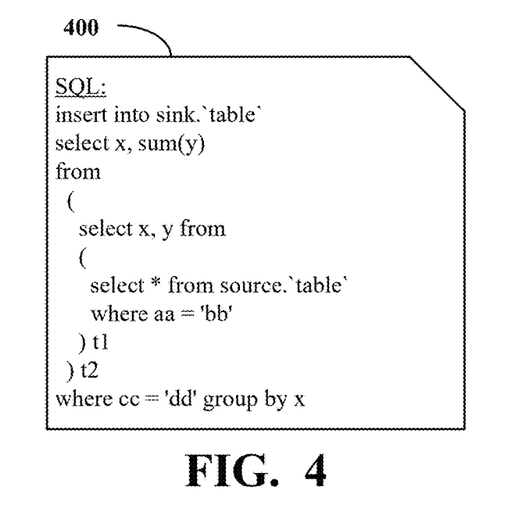
FIG. 4 is an example of SQL code.

FIG. 4 is an example of SQL code 400, comprising one or more SQL queries. The one or more queries of the SQL code 400 may be, for example, the SQL query 306 of FIG. 3.

Figure 5:
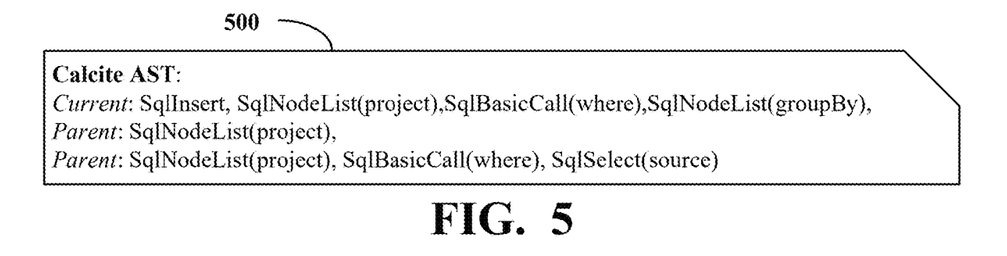
FIG. 5 is an example of an Abstract Syntax Tree (AST) comprising a set of SqlNodes.

FIG. 5 is an example of an AST 500 comprising a set of SqlNodes that correspond to the SQL code 400 of FIG. 4. The unresolved logical plan 312, the logical plan 314, and/or the optimized logical plan 316 may each be further represented by a DAG, for example, by translating the AST into a DOT language format for utilization by a DAG-visualization tool such as Graphviz. However, such a DAG of a logical plan may lack comprehensive information about the execution of the SQL query 306. For instance, such a DAG of a logical plan may not adequately convey parallelism or data-exchange strategies, which are crucial details for understanding and optimizing query performance.

Figure 6:
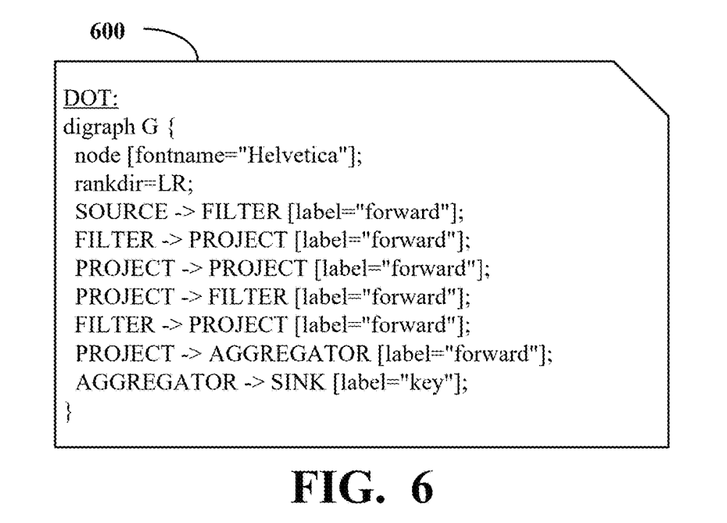
FIG. 6 is an example of a DAG represented by the DOT ("DAG of tomorrow") language.

FIG. 6 is an example of a DOT language representation of a DAG 600 that may be utilized by a DAG-visualization tool such as Graphviz.

Referring again to FIG. 3, once the compiler 310 generates the optimized logical plan 316, the compiler passes the optimized logical plan 316 to the backend 318 for execution. The backend 318 comprises several stages that yield, respectively, one or more initial physical plans 320, a selected physical plan 324, and RDDs 346. The initial physical plans 320 represent the actual execution plans generated from the optimized logical plan 316 according to various resource allocations. The cost model 322 evaluates the cost associated with the different initial physical plans 320, considering factors such as data distribution, resource utilization, and execution time. Based on the analysis of the cost model 322, the backend 318 selects the most efficient of the initial physical plans 320, referred to as the selected physical plan 324. Finally, the backend 318 translates the selected physical plan 324 into RDDs for distributed data processing, which enables parallel execution of SQL queries across multiple nodes in a cluster, such as the worker node 120 and the worker node 130 in the cluster 140 of FIG. 1. The distributed execution of SQL queries enhances scalability and performance, particularly for handling large volumes of data.

Figure 7:
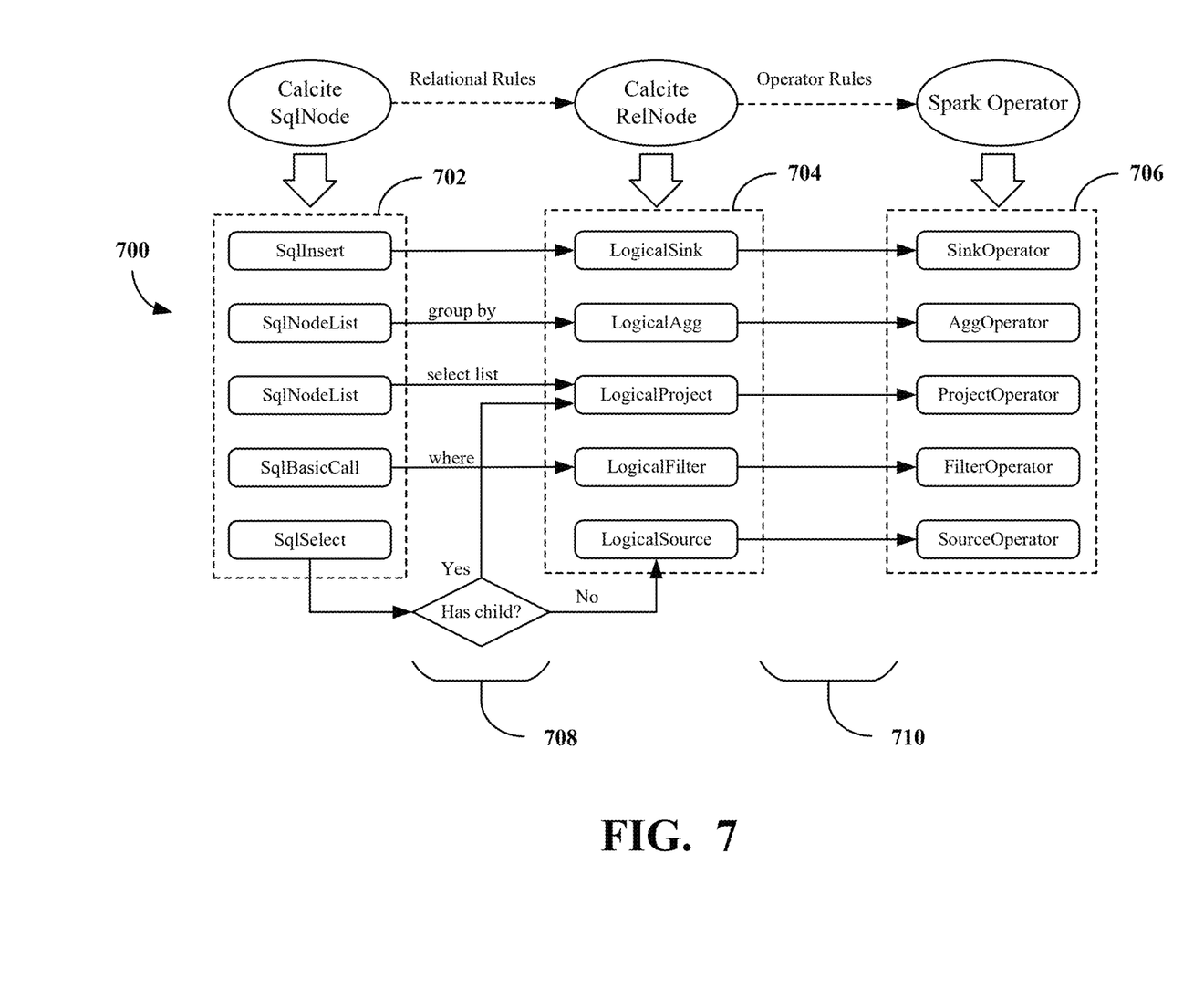
FIG. 7 is an example of a system for mapping SqlNodes to RelNodes and for mapping RelNodes to Spark operators for use in creating a global DAG of an execution plan.

FIG. 7 is an example of a system 700 for mapping SqlNodes to RelNodes and for mapping RelNodes to Spark operators for use in creating a global DAG of an execution plan. The system 700 may be implemented by one or more computing devices, such as the computing device 200 of FIG. 2. Each SqlNode represents node information in a logical plan, such as the optimized logical plan 316 of FIG. 3. A compiler compiles SQL code, such as the SQL code 400 of FIG. 4, to generate the set of SqlNodes 702, which may be, for example, the set of SqlNodes of the AST 500 of FIG. 5. In some implementations, the compiler may be Calcite, the SqlNodes may be represented by an SqlNodeList, and the SqlNodes may include, without limitation, SqlInsert, SqlNodeList, SqlBasicCall, and SqlSelect. Each SqlNode that is other than a root SqlNode includes information identifying one or more parent SqlNodes. A parent SqlNode is an SqlNode that has one or more child SqlNodes. As shown in FIG. 5, parent information is indicated from left to right and top to bottom, such that SqlInsert, at the upper left, is the ultimate child SqlNode and SqlSelect, at the lower right, is the root SqlNode.

The compiler then maps the SqlNodes of the set of SqlNodes 702 to a set of RelNodes 704 according to one or more relational rules 708. In some implementations the relational rules 708 are implemented by the compiler. In some implementations, the compiler may be Calcite, which implements a Java language object "SqlToRelConverter" that can convert a set of SqlNodes into a relational algebraic expression comprising a set of RelNodes. Each RelNode is a relational expression, or relational-expression object, that represents node information in a physical execution plan, such as the selected physical execution plan 324 of FIG. 3. During the mapping of SqlNodes to RelNodes, parent information is retained, such that each RelNode that is other than a root RelNode includes information identifying one or more parent RelNodes. A parent RelNode is a RelNode that has one or more child RelNodes.

The execution information indicated by each RelNode is generic information that is not specific to a given execution engine, and therefore, the execution plan represented by the RelNodes is similarly generic. Thus, each RelNode of the set of RelNodes 704 must be mapped to a specific execution-engine operator, such as a Spark operator of the set of Spark operators 706 of FIG. 7, according to one or more operator rules 710, to create an execution-engine-specific execution plan as a prerequisite to creating a global DAG that describes the entire job corresponding to an SQL code. In some implementations, each RelNode of the list of RelNodes 704 is mapped to one Spark operator based on regular-expression matching between RelNode names and Spark-operator names. For example, the LogicalSink Relnode maps to the SinkOperator operator based on the regular-expression matching of "Sink"; the LogicalAgg Relnode maps to the AggOperator operator based on the regular-expression matching of "Agg"; the LogicalProject Relnode maps to the ProjectOperator operator based on the regular-expression matching of "Project"; the LogicalFilter Relnode maps to the FilterOperator operator based on the regular-expression matching of "Filter"; and the LogicalSource Relnode maps to the SourceOperator operator based on the regular-expression matching of "Source."

Figure 8:
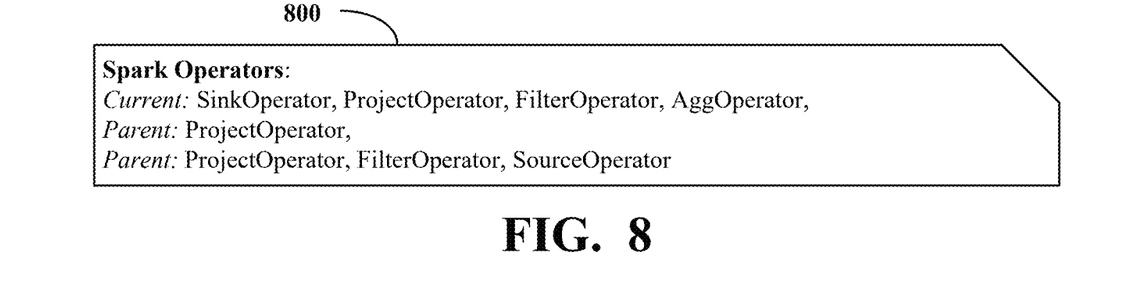
FIG. 8 is an example of a list of Spark operators.

FIG. 8 is an example of a set of Spark operators 800 resulting from a mapping of a set of RelNodes, having been mapped from the set of SqlNodes of the AST of FIG. 5, according to the operator rules 710 of FIG. 7. During the mapping of RelNodes to Spark operators, parent information is retained, such that each operator that is other than a root operator includes information identifying one or more parent operators. A parent operator is an operator that has one or more child operators. As shown in FIG. 8, parent information is indicated from left to right and top to bottom, such that SinkOperator, at the upper left, is the ultimate child operator and SourceOperator, at the lower right, is the root operator.

In some implementations, during or after the mapping of RelNodes to operators, the system 700 may receive input indicating a level of execution parallelism associated with at least an individual one of the operators. In some implementations, during or after the mapping of RelNodes to operators, the system 700 may receive input indicating cache enablement associated with at least an individual one of the operators. In some implementations, the input indicating a level of execution parallelism and/or the input indicating cache enablement is received from a user, for example, via a user interface such as the user interface 212 of FIG. 2.

Based on the set of Spark operators 706 of FIG. 7, where the set of Spark operators 706 includes parent information, and optionally includes execution parallelism information and cache enablement information, the system 700 can create a global DAG of the execution plan that is specific to the Spark execution engine (or another execution engine in the case where the RelNodes are mapped to operators of the other execution engine). As explained earlier, this global DAG is derived from the logical plan without the requiring the Spark execution engine (or other execution engine) to dynamically generate incremental local DAGs at the time of execution of the SQL queries. Such a pre-execution global DAG thereby allows a developer to explore execution-performance optimizations prior to actual execution, for example, by modifying execution parallelism and/or cache enablement.

Figure 9:
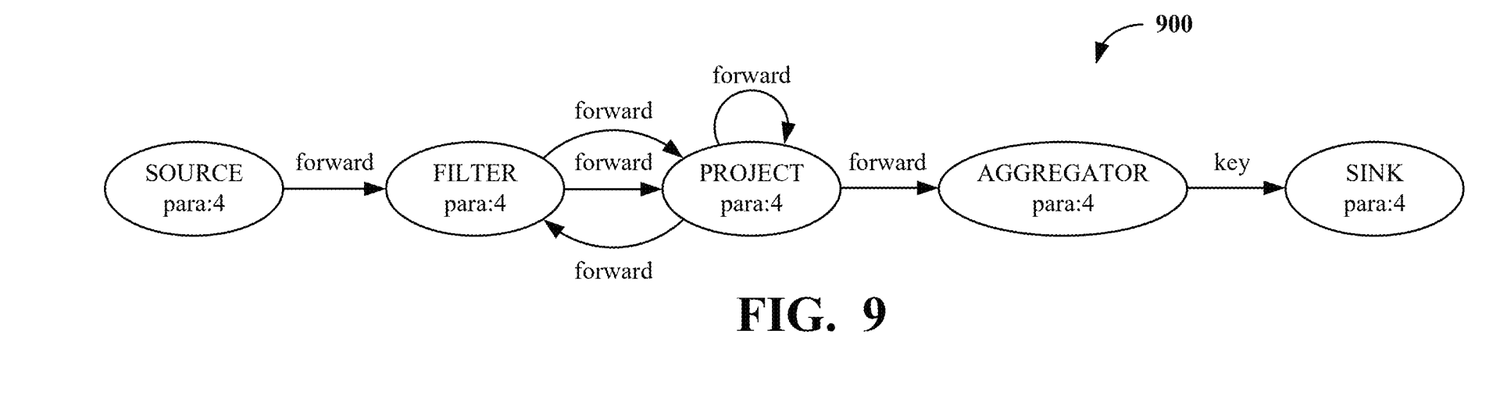
FIG. 9 is an example of a DAG represented in graphical form.

FIG. 9 shows an example of a global DAG 900 of an execution plan that corresponds to the SQL code 400 of FIG. 4, according to the relational rules 708 of FIG. 7 and the operator rules 710 of FIG. 7. Each vertex of the DAG 900 corresponds to a Spark operator, such as a Spark operator of the set of Spark operators 706 of FIG. 7, and each vertex is labeled with an indication of that Spark operator, such as the name of the Spark operator or an abstracted version of the name of the Spark operator, for example, SOURCE, FILTER, PROJECT, AGGREGATOR, and SINK, as shown in FIG. 8. Each vertex may further convey a level of execution parallelism, for example, "para: 4" to indicate 4 cores or 4 executors executing in parallel for a given Spark operation. Each vertex may further convey, for example, whether data caching is enabled for the given Spark operation. Each edge of the DAG 900 corresponds to a flow of data between these operations, such as forward and key (or shuffle). The DAG may be displayed via a graphical user interface, wherein the graphical user interface may be displayed by a user interface, such as the user interface 212 of FIG. 2. In some implementations, the graphical user interface may comprise a third-party visualization tool, such as Graphviz.

Although Spark is used in the examples of the disclosed implementations herein, the invention is broadly applicable to other suitable execution engines.

Figure 10:
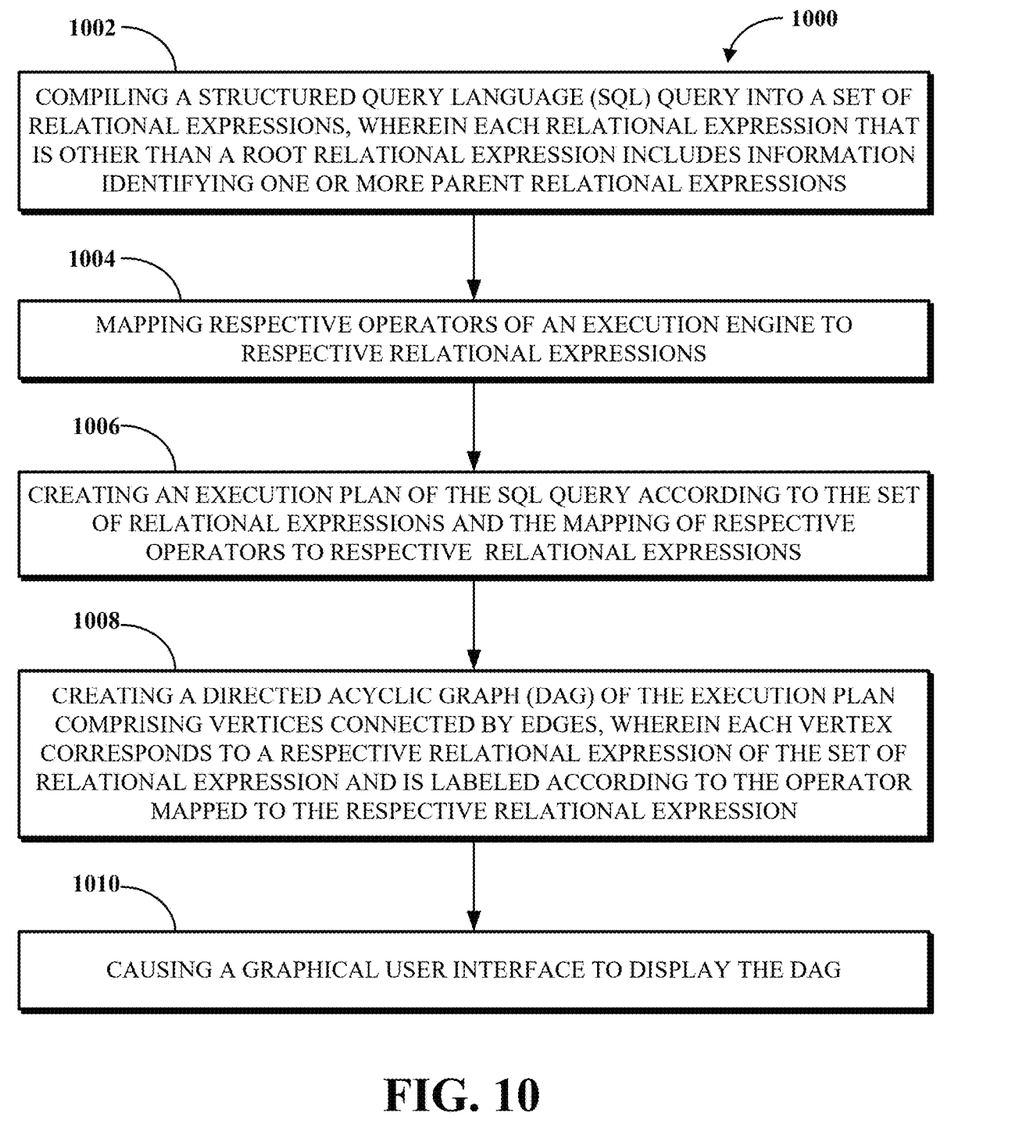
FIG. 10 is a flowchart of an example of a technique for creating a global DAG of an execution plan for optimization and execution via a distributed execution engine.

To further describe some implementations in greater detail, reference is next made to FIG. 10, which is a flowchart of an example of a technique 1000, which may be performed by or using one or more computing devices, for creating a global DAG of an execution plan for optimization and execution via a distributed execution engine.

The technique 1000 can be executed using computing devices, such as the systems, hardware, and software described or referenced with respect to FIGS. 1-9. The technique 1000 can be performed, for example, by executing a machine-readable program or other computer-executable instructions, such as routines, instructions, programs, or other code. The steps, or operations, of the technique 1000, or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations of the technique 1000 in accordance with this disclosure can occur in various orders and/or concurrently. Additionally, other steps or operations not presented and described herein may be used. Furthermore, not all illustrated steps or operations may be required to implement a technique in accordance with the disclosed subject matter. The technique 1000 may be performed by one or more components of a distributed computing system, such as one or more computing devices, such as the master node 102, cluster manager 108, worker node 120, and/or worker node 130 of FIG. 1.

The step 1002 comprises compiling an SQL query into a set of relational expressions, wherein each relational expressions that is other than a root relational expression includes information identifying one or more parent relational expressions. The SQL query may be the one or more SQL queries of the SQL code 400 of FIG. 4. The SQL query may be compiled via a compiler, such as the compiler 310 of FIG. 3 into a set of SqlNodes, such as the AST 500 of FIG. 5 or the set of SqlNodes 702 of FIG. 7. In some implementations, the compiler may be or include Calcite. The set of relational expressions may be, for example, the set of RelNodes 704 of FIG. 7.

The step 1004 comprises mapping respective operators of an execution engine to respective relational expressions. In some implementations, the respective operators may be operators of a distributed execution engine, such as Spark. In some implementations, the respective operators may comprise the Spark operators 706 of FIG. 7. In some implementations, a one operator maps to one relational expression.

The step 1006 comprises creating an execution plan of the SQL query according to the set of relational expressions and the mapping of respective operators to respective relational expressions. In some implementations, the execution plan may be translated to a DOT language description.

The step 1008 comprises creating a directed acyclic graph (DAG) of the execution plan comprising vertices connected by edges, wherein each vertex corresponds to a respective relational expression of the set of relational expressions and is labeled according to the operator mapped to the respective relational expression. In some implementations, chain optimization may be performed on the execution plan, wherein at least two vertices are merged according to the chain optimization. In some implementations, user input is received indicating a level of execution parallelism associated with an individual one of the operators, and the vertex labeled by the individual one of the operators is further labeled with the level of execution parallelism. In some implementations, user input is received indicating a cache enablement associated with an individual one of the operators, and the vertex labeled by the individual one of the operators is further labeled with the cache enablement. In some implementations, at least one edge incident to a respective vertex is labeled according to a shuffle strategy based on an origin vertex of the at least one edge and the respective vertex. In some implementations, at least one edge incident to a respective vertex is labeled as "Key" where an origin vertex of the at least one edge is labeled as "Join," "Union," "Aggregate," or "Sink." In some implementations, at least one edge incident to a respective vertex is labeled as "Forward" where an origin vertex of the at least one edge is labeled as "Source," "Filter," "Project," or "KeyBy." In some implementations, at least one vertex is labeled as "Join," "Union," "Aggregate," "Sink," "Source," "Filter," "Project," or "KeyBy."

The step 1010 comprises causing a graphical user interface to display the DAG. In some implementations, the graphical user interface may be displayed by the user interface 212 of FIG. 2. In some implementations, the DAG may be generated using a third-party visualization tool, such as Graphviz, where, for example, a DOT language description of the DAG is created for input to the third-party visualization tool.

In some implementations, an execution of the execution plan is simulated by traversing the DAG from its root vertex, where the root vertex corresponds to the beginning of the SQL code represented by the DAG. Simulation of the execution plan is a computer-based simulation that that traces the flow of data through the system without the accessing and/or manipulation of the actual data of the distributed computing system. In some implementations, each vertex or edge is spotlighted, via the graphical user interface, while its execution is being simulated. Simulation of the execution plan may be performed by a computing device, such as the computing device 200 of FIG. 2.

Some implementations of creating a global DAGs of an execution plan for optimization and execution via a distributed execution engine disclosed herein include a method, comprising: compiling a Structured Query Language (SQL) query into a set of relational expressions, wherein each relational expression that is other than a root relational expression includes information identifying one or more parent relational expressions; mapping respective operators of an execution engine to respective relational expressions; creating an execution plan of the SQL query according to the set of relational expressions and the mapping of respective operators to respective relational expressions; creating a directed acyclic graph (DAG) of the execution plan comprising vertices connected by edges, wherein each vertex corresponds to a respective relational expression of the set of relational expressions and is labeled according to the operator mapped to the respective relational expression; and causing a graphical user interface to display the DAG.

In some implementations, the method further comprises: receiving user input indicating a level of execution parallelism associated with an individual one of the operators; and further labeling the vertex labeled by the individual one of the operators with the level of execution parallelism.

In some implementations, the method further comprises: receiving user input indicating cache enablement associated with an individual one of the operators; and further labeling the vertex labeled by the individual one of the operators with the cache enablement.

In some implementations, the method further comprises: mapping respective operators of an execution engine to respective relational expressions based on regular-expression matching between names of respective relational expressions and names of respective operators.

In some implementations, the method further comprises: labeling at least one edge incident to a respective vertex according to a shuffle strategy based on an origin vertex of the at least one edge and the respective vertex.

In some implementations, the method further comprises: labeling at least one edge incident to a respective vertex as "Key" where an origin vertex of the at least one edge is labeled as "Join," "Union," "Aggregate," or "Sink."

In some implementations, the method further comprises: labeling at least one edge incident to a respective vertex as "Forward" where an origin vertex of the at least one edge is labeled as "Source," "Filter," "Project," or "KeyBy."

In some implementations, the method further comprises: labeling at least one vertex as "Join," "Union," "Aggregate," "Sink," "Source," "Filter," "Project," or "KeyBy."

In some implementations, the method further comprises: translating the execution plan to a DOT description.

In some implementations, the method further comprises: simulating an execution of the execution plan by traversing the DAG from its root vertex.

In some implementations, the method further comprises: performing chain optimization on the execution plan; and merging at least two vertices according to the chain optimization.

Some implementations of creating a global DAGs of an execution plan for optimization and execution via a distributed execution engine disclosed herein include a non-transitory computer-readable medium storing instructions operable to cause one or more processors to perform operations comprising: compiling a Structured Query Language (SQL) query into a set of relational expressions, wherein each relational expression that is other than a root relational expression includes information identifying one or more parent relational expressions; mapping respective operators of an execution engine to respective relational expressions; creating an execution plan of the SQL query according to the set of relational expressions and the mapping of respective operators to respective relational expressions; creating a directed acyclic graph (DAG) of the execution plan comprising vertices connected by edges, wherein each vertex corresponds to a respective relational expression of the set of relational expressions and is labeled according to the operator mapped to the respective relational expression; and causing a graphical user interface to display the DAG.

In some implementations, the operations further comprise: translating the execution plan to a DOT description; and causing the graphical user interface to display the DAG, generated by a third-party visualization tool, according to the DOT description, via the graphical user interface.

In some implementations, the operations further comprise: labeling each edge incident to a respective vertex as "Key" where an origin vertex of the respective edge is labeled as "Join," "Union," "Aggregate," or "Sink."

In some implementations, the operations further comprise: labeling each edge incident to a respective vertex as "Forward" where an origin vertex of the respective edge is labeled as "Source," "Filter," "Project," or "KeyBy."

Some implementations of creating a global DAGs of an execution plan for optimization and execution via a distributed execution engine disclosed herein include a system, comprising: compile a Structured Query Language (SQL) query into a set of relational expressions, wherein each relational expression that is other than a root relational expression includes information identifying one or more parent relational expressions; map respective operators of an execution engine to respective relational expressions; create an execution plan of the SQL query according to the set of relational expressions and the mapping of respective operators to respective relational expressions; create a directed acyclic graph (DAG) of the execution plan comprising vertices connected by edges, wherein each vertex corresponds to a respective relational expression of the set of relational expressions and is labeled according to the operator mapped to the respective relational expression; and cause a graphical user interface to display the DAG.

In some implementations, the one or more processors are configured to execute the instructions to: receive user input indicating a level of execution parallelism and a cache enablement associated with an individual one of the operators; and further label the vertex labeled by the individual one of the operators with the level of execution parallelism and the cache enablement.

In some implementations, the one or more processors are configured to execute the instructions to: label each edge incident to a respective vertex according to a shuffle strategy based on an origin vertex of the respective edge and the respective vertex.

In some implementations, the one or more processors are configured to execute the instructions to: perform chain optimization on the execution plan; and merge all possible vertices according to the chain optimization.

In some implementations, the one or more processors are configured to execute the instructions to: simulate an execution of the execution plan by traversing the DAG from its root vertex; and spotlighting, via the graphical user interface, each vertex or edge while its execution is being simulated.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
compiling a Structured Query Language (SQL) query into a set of relational expressions, wherein each relational expression that is other than a root relational expression includes information identifying one or more parent relational expressions;
mapping respective operators of an execution engine to respective relational expressions;
creating an execution plan of the SQL query according to the set of relational expressions and the mapping of respective operators to respective relational expressions;
creating a directed acyclic graph (DAG) of the execution plan comprising vertices connected by edges, wherein each vertex corresponds to a respective relational expression of the set of relational expressions and is labeled according to the operator mapped to the respective relational expression; and
causing a graphical user interface to display the DAG.

2. The method of claim 1, further comprising:
receiving user input indicating a level of execution parallelism associated with an individual one of the operators; and
further labeling the vertex labeled by the individual one of the operators with the level of execution parallelism.

3. The method of claim 1, further comprising:
receiving user input indicating cache enablement associated with an individual one of the operators; and
further labeling the vertex labeled by the individual one of the operators with the cache enablement.

4. The method of claim 1, further comprising:
mapping respective operators of an execution engine to respective relational expressions based on regular-expression matching between names of respective relational expressions and names of respective operators.

5. The method of claim 1, further comprising:
labeling at least one edge incident to a respective vertex according to a shuffle strategy based on an origin vertex of the at least one edge and the respective vertex.

6. The method of claim 1, further comprising:
labeling at least one edge incident to a respective vertex as "Key" where an origin vertex of the at least one edge is labeled as "Join," "Union," "Aggregate," or "Sink".

7. The method of claim 1, further comprising:
labeling at least one edge incident to a respective vertex as "Forward" where an origin vertex of the at least one edge is labeled as "Source," "Filter," "Project," or "KeyBy".

8. The method of claim 1, further comprising:
labeling at least one vertex as "Join," "Union," "Aggregate," "Sink," "Source," "Filter," "Project," or "KeyBy".

9. The method of claim 1, further comprising:
translating the execution plan to a DOT description.

10. The method of claim 1, further comprising:
simulating an execution of the execution plan by traversing the DAG from its root vertex.

11. The method of claim 1, further comprising:
performing chain optimization on the execution plan; and
merging at least two vertices according to the chain optimization.

12. A non-transitory computer-readable medium storing instructions operable to cause one or more processors to perform operations comprising:
compiling a Structured Query Language (SQL) query into a set of relational expressions, wherein each relational expression that is other than a root relational expression includes information identifying one or more parent relational expressions;
mapping respective operators of an execution engine to respective relational expressions;
creating an execution plan of the SQL query according to the set of relational expressions and the mapping of respective operators to respective relational expressions;
creating a directed acyclic graph (DAG) of the execution plan comprising vertices connected by edges, wherein each vertex corresponds to a respective relational expression of the set of relational expressions and is labeled according to the operator mapped to the respective relational expression; and
causing a graphical user interface to display the DAG.

13. The medium of claim 12, the operations further comprising:
translating the execution plan to a DOT description; and
causing the graphical user interface to display the DAG, generated by a third-party visualization tool, according to the DOT description, via the graphical user interface.

14. The medium of claim 12, the operations further comprising:
labeling each edge incident to a respective vertex as "Key" where an origin vertex of the respective edge is labeled as "Join," "Union," "Aggregate," or "Sink".

15. The medium of claim 12, the operations further comprising:
labeling each edge incident to a respective vertex as "Forward" where an origin vertex of the respective edge is labeled as "Source," "Filter," "Project," or "KeyBy".

16. A system, comprising:
one or more memories; and
one or more processors configured to execute instructions stored in the one or more memories to:
compile a Structured Query Language (SQL) query into a set of relational expressions, wherein each relational expression that is other than a root relational expression includes information identifying one or more parent relational expressions;
map respective operators of an execution engine to respective relational expressions;
create an execution plan of the SQL query according to the set of relational expressions and the mapping of respective operators to respective relational expressions;
create a directed acyclic graph (DAG) of the execution plan comprising vertices connected by edges, wherein each vertex corresponds to a respective relational expression of the set of relational expressions and is labeled according to the operator mapped to the respective relational expression; and
cause a graphical user interface to display the DAG.

17. The system of claim 16, wherein the one or more processors are configured to execute the instructions to:
receive user input indicating a level of execution parallelism and a cache enablement associated with an individual one of the operators; and
further label the vertex labeled by the individual one of the operators with the level of execution parallelism and the cache enablement.

18. The system of claim 16, wherein the one or more processors are configured to execute the instructions to:
label each edge incident to a respective vertex according to a shuffle strategy based on an origin vertex of the respective edge and the respective vertex.

19. The system of claim 16, wherein the one or more processors are configured to execute the instructions to:
perform chain optimization on the execution plan; and
merge all possible vertices according to the chain optimization.

20. The system of claim 16, wherein the one or more processors are configured to execute the instructions to:
simulate an execution of the execution plan by traversing the DAG from its root vertex; and
spotlighting, via the graphical user interface, each vertex or edge while its execution is being simulated.

* * * * *